United States Patent
Theuerkorn et al.

(10) Patent No.: US 7,137,742 B2
(45) Date of Patent: Nov. 21, 2006

(54) FIBER OPTIC RECEPTACLE AND PLUG ASSEMBLIES WITH ALIGNMENT AND KEYING FEATURES

(75) Inventors: Thomas Theuerkorn, Hickory, NC (US); Martin E. Norris, Lenoir, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/066,986

(22) Filed: Feb. 25, 2005

(65) Prior Publication Data

US 2006/0045430 A1    Mar. 2, 2006

Related U.S. Application Data

(63) Continuation-in-part of application No. 10/924,525, filed on Aug. 24, 2004.

(51) Int. Cl.
G02B 6/36    (2006.01)
(52) U.S. Cl. ........................................................ 385/53
(58) Field of Classification Search ................ 385/53, 385/55, 58–60, 70–72, 76–79, 86
See application file for complete search history.

(56) References Cited

U.S. PATENT DOCUMENTS

| | | | |
|---|---|---|---|
| 4,140,367 A * | 2/1979 | Makuch et al. ................ 385/59 |
| 4,142,776 A | 3/1979 | Cherin et al. ............. 350/96.21 |
| 4,174,882 A | 11/1979 | McCartney ............... 350/96.21 |
| 4,225,214 A | 9/1980 | Hodge et al. ............. 350/96.21 |
| 4,279,467 A | 7/1981 | Borsuk et al. ............ 350/96.21 |
| 4,684,205 A * | 8/1987 | Margolin et al. ............. 385/68 |
| 4,705,352 A * | 11/1987 | Margolin et al. ............. 385/81 |
| 4,793,683 A | 12/1988 | Cannon, Jr. et al. ..... 350/96.21 |
| 5,042,901 A | 8/1991 | Merriken et al. ........... 385/135 |
| 5,104,242 A | 4/1992 | Ishikawa ...................... 385/53 |
| 5,267,342 A | 11/1993 | Takahashi et al. .......... 385/140 |
| 5,283,848 A | 2/1994 | Abendschein et al. ........ 385/59 |
| 5,715,342 A | 2/1998 | Nodfelt et al. ................ 385/61 |
| 5,778,122 A | 7/1998 | Giebel et al. ................. 385/55 |
| 5,892,870 A | 4/1999 | Fingler et al. ................ 385/59 |

(Continued)

FOREIGN PATENT DOCUMENTS

EP    0156075 A2    12/1984

(Continued)

OTHER PUBLICATIONS

Fiber Systems International Fiber Optic Solutions Spec Sheet, TFOCA-II® 4-Channel Fiber Optic Connector, 2 sheets, 2003.

*Primary Examiner*—Sarah Song
(74) *Attorney, Agent, or Firm*—Jeffrey S. Bernard

(57) ABSTRACT

A fiber optic receptacle and plug assembly comprising a fiber optic receptacle adapted to be mounted within a connector port of a network connection terminal and a fiber optic plug mounted upon an end of a fiber optic cable, wherein the fiber optic receptacle and the fiber optic plug comprise complimentary alignment and keying features that allow the fiber optic receptacle to receive only a fiber optic plug of like ferrule configuration. The fiber optic plug comprises an alignment sleeve operable for receiving and optically connecting at least one plug ferrule and at least one receptacle ferrule. The receptacle is suitable for use in enclosures requiring a minimal receptacle penetration depth, wherein the fiber optic receptacle comprises a shoulder that is secured against an inner wall of the enclosure to provide strain relief against cable pulling forces of up to about 600 lbs.

11 Claims, 12 Drawing Sheets

U.S. PATENT DOCUMENTS

| | | |
|---|---|---|
| 5,920,669 A | 7/1999 | Knecht et al. ............ 385/76 |
| 5,940,559 A | 8/1999 | Noll .......................... 385/53 |
| 6,206,579 B1 | 3/2001 | Selfridge et al. ......... 385/60 |
| 6,234,683 B1 | 5/2001 | Waldron et al. .......... 385/78 |
| 6,264,374 B1 | 7/2001 | Selfridge et al. ......... 385/78 |
| 6,305,849 B1 | 10/2001 | Roehrs et al. ............ 385/59 |
| 6,357,929 B1 | 3/2002 | Roehrs et al. ............ 385/59 |
| 6,371,660 B1 | 4/2002 | Roehrs et al. ............ 385/59 |
| 6,579,014 B1 | 6/2003 | Melton et al. ............ 385/76 |
| 6,648,520 B1 | 11/2003 | McDonald et al. ....... 385/78 |
| 6,685,361 B1 | 2/2004 | Rubino et al. ............ 385/58 |
| 2003/0063867 A1* | 4/2003 | McDonald et al. ....... 385/78 |
| 2005/0041928 A1 | 2/2005 | Zimmel et al. |

FOREIGN PATENT DOCUMENTS

EP            0689069 A1    6/1995

* cited by examiner

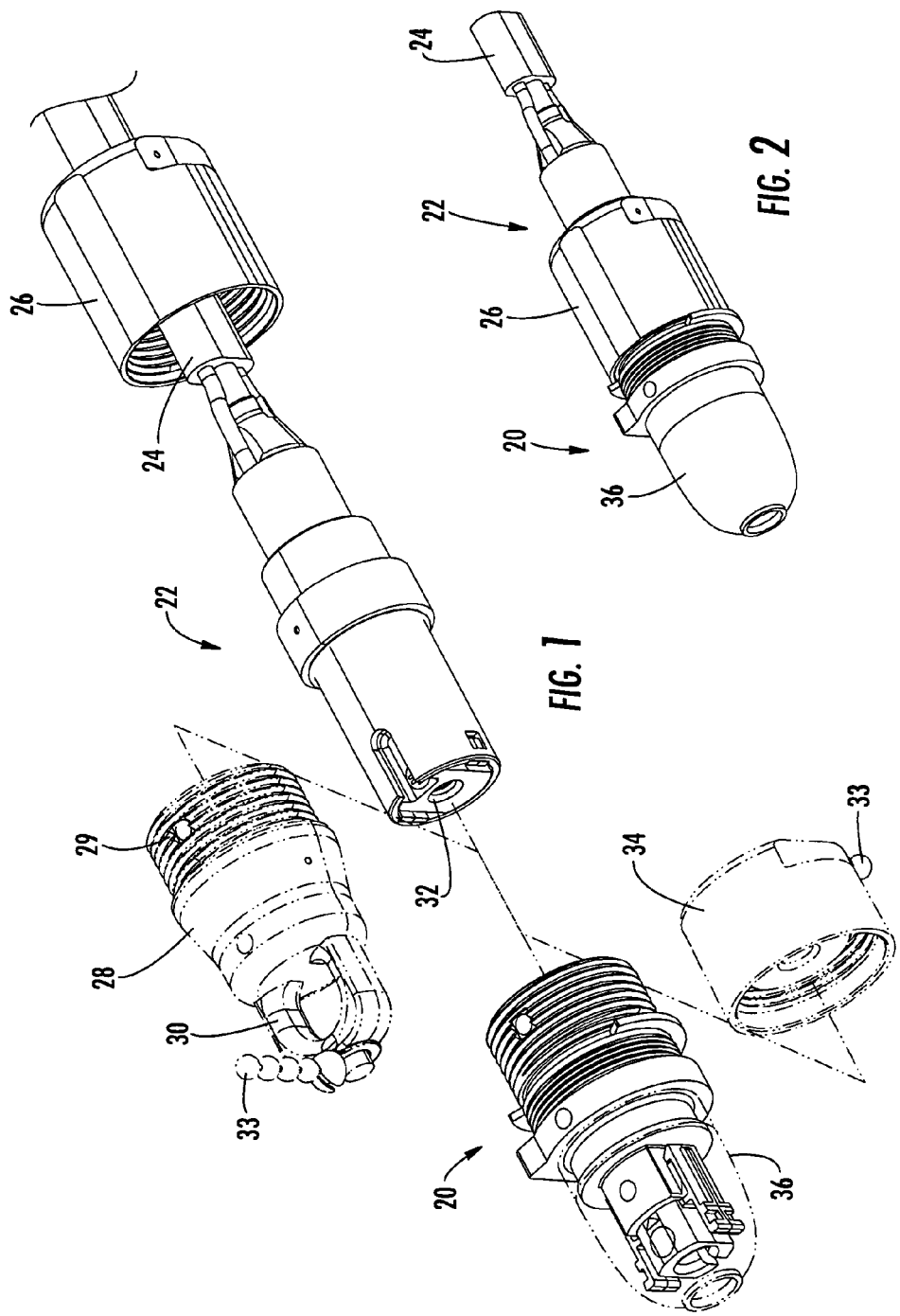

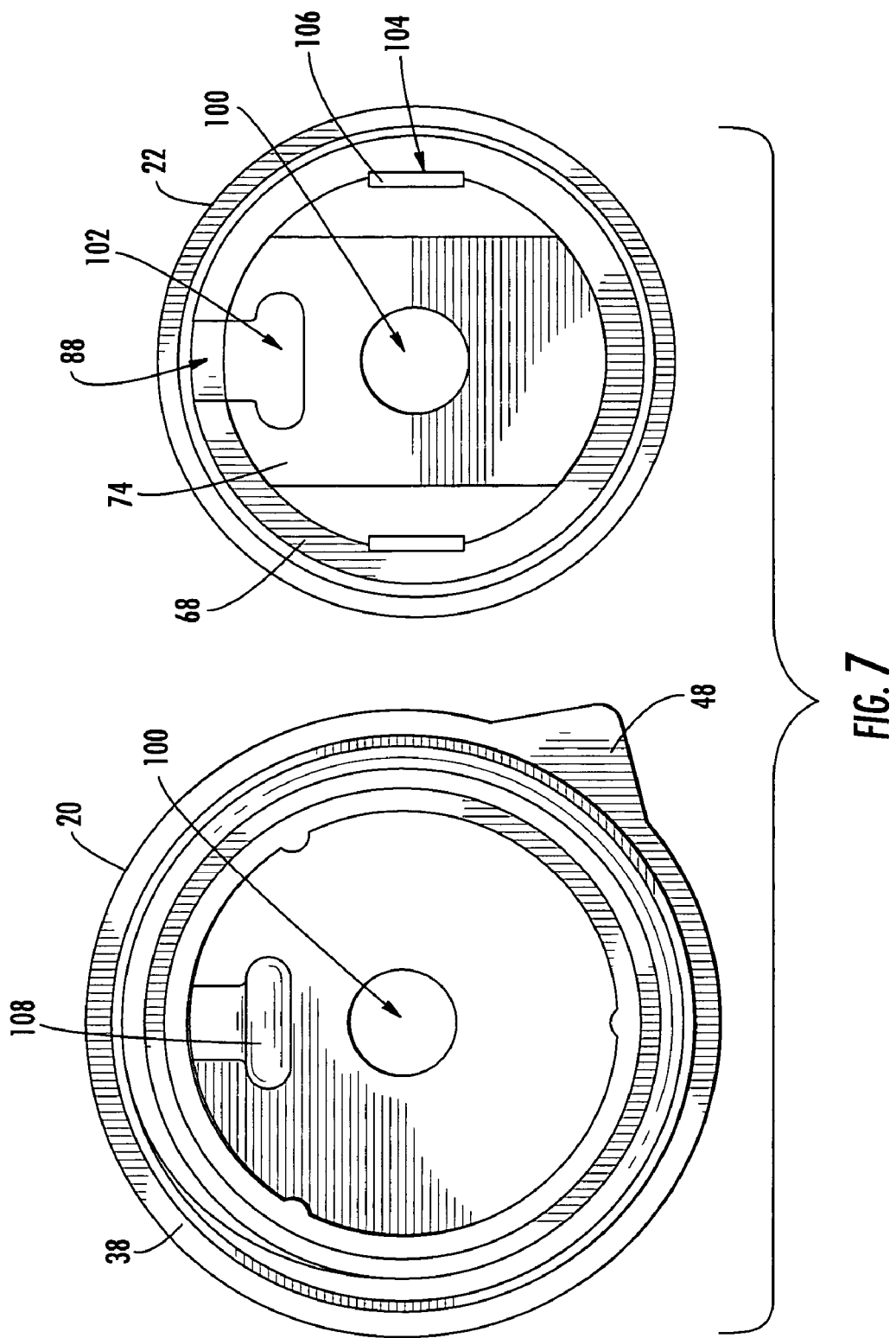

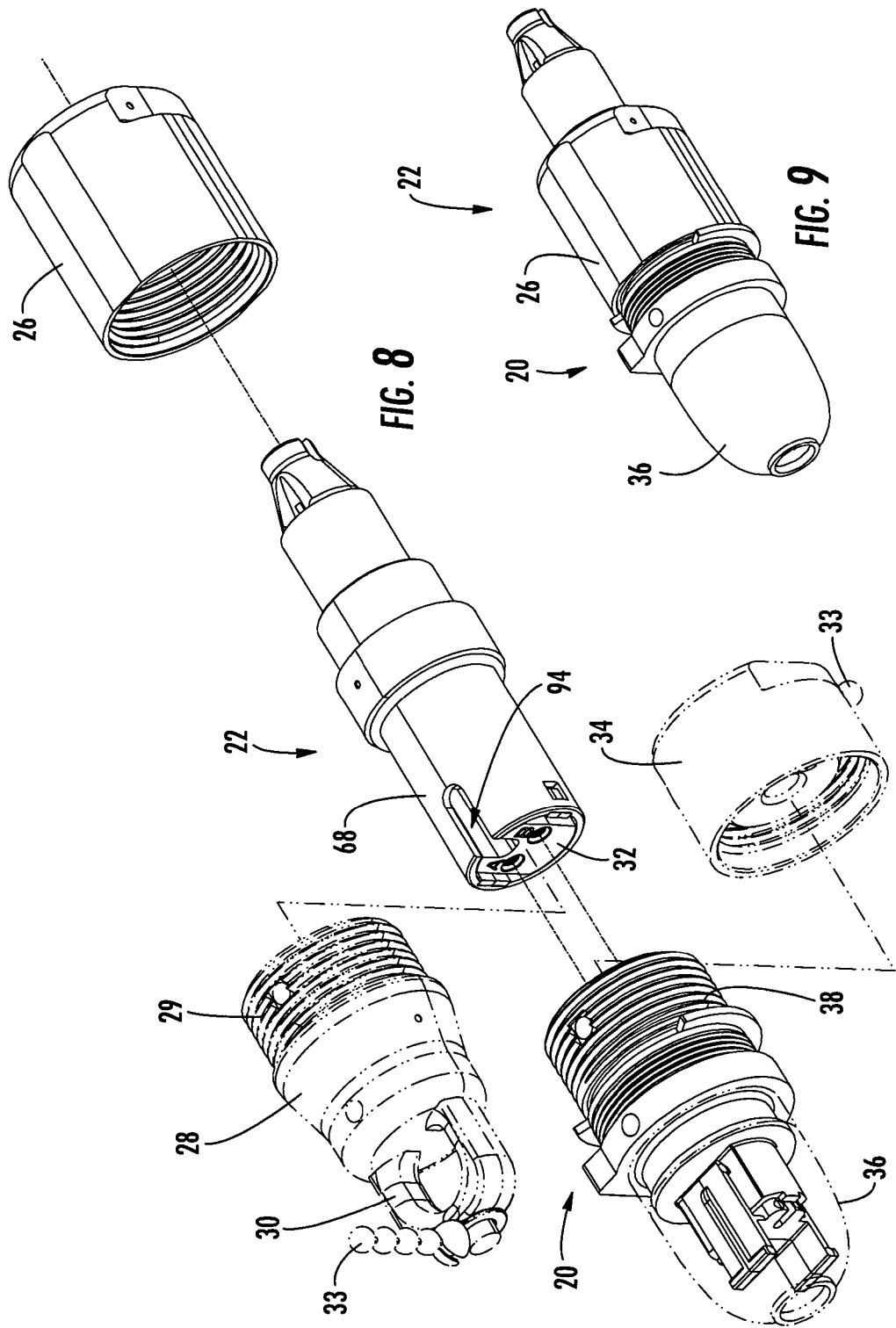

FIBER OPTIC RECEPTACLE AND PLUG ASSEMBLIES WITH ALIGNMENT AND KEYING FEATURES

CROSS-REFERENCE TO RELATED APPLICATIONS

This application is a continuation-in-part of U.S. application Ser. No. 10/924,525 filed Aug. 24, 2004, entitled "FIBER OPTIC RECEPTACLE AND PLUG ASSEMBLIES."

BACKGROUND OF THE INVENTION

1. Field of the Invention

The present invention relates generally to assemblies for interconnecting optical fibers, and more specifically, to fiber optic receptacle and plug assemblies with alignment and keying features for interconnecting optical fibers within a fiber optic communications network.

2. Description of the Related Art

Optical fiber is increasingly being used for a variety of broadband applications including voice, video and data transmissions. As a result, fiber optic communications networks include a number of interconnection points at which optical fibers are interconnected with other optical fibers. Fiber optic networks also include a number of connection terminals, examples of which include, but are not limited to, network access point (NAP) enclosures, aerial closures, below grade closures, pedestals, optical network terminals (ONTs) and network interface devices (NIDs). In certain instances the connection terminals include connector ports, typically opening through an external wall of the terminal, that are used to establish optical connections between optical fibers terminated from the distribution cable and respective optical fibers of one or more pre-connectorized drop cables, extended distribution cables, tether cables or branch cables, collectively referred to herein as "drop cables." The connection terminals are used to provide communications services to a subscriber. In this regard, fiber optic networks are being developed that deliver "fiber-to-the-curb" (FTTC), "fiber-to-the-business" (FTTB), "fiber-to-the-home" (FTTH) and "fiber-to-the-premises" (FTTP), referred to generically as "FTTx."

Conventional connector ports opening through an external wall of a connection terminal include a receptacle for receiving a connectorized optical fiber, such as a pigtail, optically connected within the connection terminal to an optical fiber of the distribution cable, for example in a splice tray or splice protector. At present, these receptacles are relatively large in size because the connection terminal in which they are located does not limit the size of the receptacle. Furthermore, existing receptacles include a receptacle housing defining an internal cavity that houses an alignment sleeve for receiving and aligning the mating ferrules. As previously mentioned, one of the mating ferrules is mounted upon the end of an optical fiber that is optically connected to an optical fiber of the distribution cable within the connection terminal. The other mating ferrule is mounted upon the end of an optical fiber of a drop cable that extends into the receptacle from outside the connection terminal. The alignment sleeve of the receptacle assists in gross alignment of the ferrules, and ferrule guide pins or other alignment means assist in more precise alignment of the opposing end faces of the ferrules.

In particular, a fiber optic plug mounted upon the end of a fiber optic drop cable is received within the receptacle through the external wall of the connection terminal. Typically, the plug includes a generally cylindrical plug body and a fiber optic connector including a plug ferrule disposed within the cylindrical plug body. The end of the cylindrical plug body is open, or is provided with openings, so that the ferrule is accessible. The plug ferrule is mounted upon one or more optical fibers of the fiber optic drop cable such that mating the plug with the receptacle aligns the optical fibers of the drop cable with respective optical fibers terminated from the distribution cable within the connection terminal. In the process of mating the plug with the receptacle, the plug ferrule is inserted into one end of the alignment sleeve housed within the receptacle. As a result of the construction of a conventional fiber optic plug, the alignment sleeve is minimally received within the open end of the plug body as the plug ferrule is inserted into the alignment sleeve.

Several different types of conventional fiber optic connectors have been developed, examples of which include, but are not limited to, SC, ST, LC, DC, MTP, MT-RJ and SC-DC connectors. The size and shape of each of these conventional connectors are somewhat different. Correspondingly, the size and shape of the alignment sleeve, the receptacle and the plug are somewhat different. As a result, in conventional practice different fiber optic receptacles and plugs are utilized in conjunction with the different types of fiber optic connectors. In this regard, the fiber optic receptacles generally define different sized internal cavities corresponding to the sizes of the alignment sleeve and, in turn, according to a ferrule of the fiber optic connector to be inserted within the alignment sleeve.

In addition to requiring the use of different fiber optic receptacles and plugs based upon the specific type of optical connector, conventional receptacle and plug assemblies are relatively large in size. More compact and optimized assemblies are needed for high density installations. Current smaller assemblies, however, are not able to satisfy the high tensile loads required for FTTx installations, including the 600 lbs. drop cable pull test requirement. Exposure to adverse environmental conditions is also a significant issue since current network plans suggest that receptacles may remain unoccupied (without a mated plug) for an extended period of time. Based on tensile load requirements and the need for prolonged environmental protection, it would be desirable to provide a fiber optic receptacle and corresponding fiber optic plug suitable for mounting in a connection terminal or similar enclosure defining an external wall through which optical fibers are interconnected. As yet however, there is an unresolved need for a compact, yet sufficiently robust fiber optic receptacle that is configured to receive only a fiber optic plug having the same type of optical fiber connector. There is a further unresolved need for a fiber optic receptacle and plug assembly adapted to accommodate an alignment sleeve and any type of optical connector, wherein the receptacle and plug define corresponding alignment and keying features.

BRIEF SUMMARY OF THE INVENTION

To achieve the foregoing and other objects, and in accordance with the purposes of the invention as embodied and broadly described herein, the present invention provides various embodiments of fiber optic receptacle and plug assemblies adapted to receive like optical connector configurations. Thus, the present invention provides fiber optic receptacle and plug assemblies designed to readily mate any like type or number of optical connectors via the use of a connector port in a wall of an enclosure. The present invention further provides low volume fiber optic receptacles designed to be secured within connector ports or similar structures of an enclosure while providing strain relief against drop cable pulling forces of up to about 600 lbs.

In an exemplary embodiment, the present invention provides a fiber optic receptacle and plug assembly comprising a fiber optic receptacle adapted to be mounted within a connector port of a network connection terminal and a corresponding fiber optic plug mounted upon an end of a fiber optic cable. The fiber optic receptacle and the fiber optic plug comprise corresponding alignment and keying features that allow the fiber optic receptacle to receive only a fiber optic plug of like ferrule configuration. The fiber optic plug engages a corresponding receptacle within a connector port provided in an external wall of a network connection terminal or other enclosure. The alignment and keying features of the fiber optic receptacle and plug assembly allow non-centric positions of at least one ferrule and radial alignment of the ferrule. The fiber optic plug includes an alignment sleeve operable for receiving and aligning the mating ferrules, thus minimizing the depth of the receptacle. The receptacle comprises a shoulder that is secured against the external wall of the connection terminal in order to provide strain relief. A protective receptacle boot allows the assembly to be installed in a breathable enclosure.

In another embodiment, the present invention provides a fiber optic receptacle and plug assembly comprising a fiber optic receptacle adapted to be mounted within a connector port of a connection terminal. The receptacle comprises a housing defining an internal cavity opening through opposed first and second ends, wherein the internal cavity is operable for receiving an alignment sleeve of a corresponding fiber optic plug through the first end. At least one receptacle ferrule is secured within the internal cavity using a ferrule retainer disposed proximate the second end. The assembly further comprises a fiber optic plug including an inner housing, an outer housing, a coupling nut, at least one plug ferrule and an alignment sleeve. The receptacle, plug housing and alignment sleeve define alignment and keying features based on ferrule configuration, thus providing a fiber optic receptacle and plug assembly that allows the receptacle to receive only a plug of like ferrule configuration. The receptacle and plug assembly further comprises biasing members that operably engage the ferrules to urge the opposing ferrules towards one another during mating.

BRIEF DESCRIPTION OF THE DRAWINGS

The above and other features, aspects and advantages of the present invention are better understood when the following detailed description of the invention is read with reference to the accompanying drawings, in which:

FIG. 1 is a perspective view of a single-fiber version of a fiber optic receptacle and plug assembly shown disengaged and with their respective protective dust and pulling caps removed;

FIG. 2 is a perspective view of the fiber optic receptacle and plug assembly of FIG. 1 shown with the receptacle and plug mated;

FIG. 7 is an end view of the receptacle and plug of FIG. 1 shown disengaged to illustrate the alignment and keying features of the receptacle and plug assembly;

FIG. 8 is a perspective view of a dual-fiber version of a fiber optic receptacle and plug assembly shown disengaged and with their respective protective dust and pulling caps removed;

FIG. 9 is a perspective view of the fiber optic receptacle and plug assembly of FIG. 8 shown with the receptacle and plug mated;

DETAILED DESCRIPTION OF THE INVENTION

Figure 3:
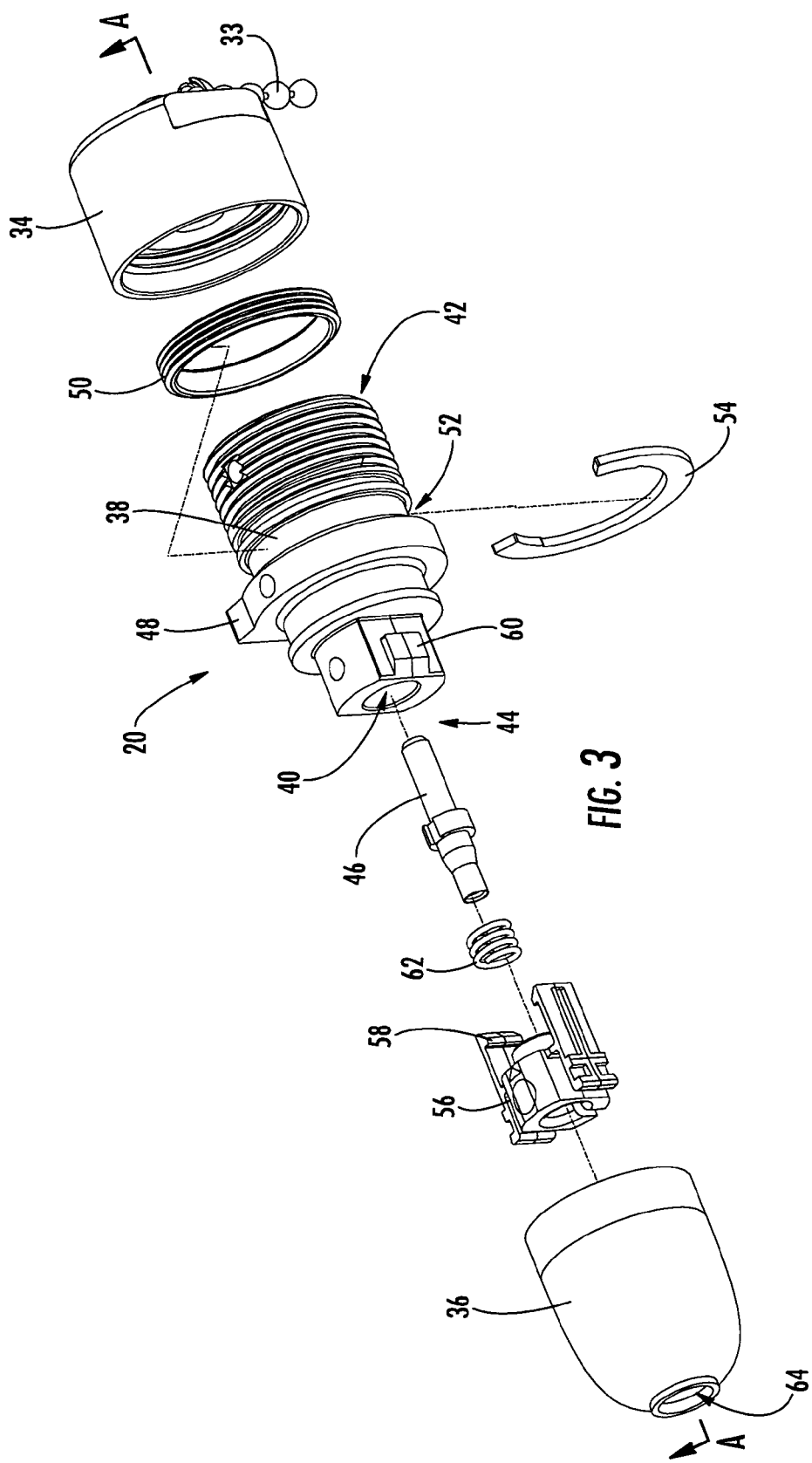
FIG. 3 is an exploded perspective view of the fiber optic receptacle of FIG. 1, including a receptacle body, a single-fiber ferrule, a ferrule retainer, a bias member and sealing members.

The present invention will now be described more fully hereinafter with reference to the accompanying drawings in which exemplary embodiments of the invention are shown. However, this invention may be embodied in many different forms and should not be construed as limited to the embodiments set forth herein. These exemplary embodiments are provided so that this disclosure will be both thorough and complete, and will fully convey the scope of the invention to those skilled in the art. Like reference numbers refer to like elements throughout the various drawings.

In the various embodiments described below, the present invention comprises fiber optic receptacle and plug assemblies including one or more optical connectors for interconnecting optical fibers within a communications network. The receptacle portion of each assembly is designed such that it may be mounted in a wall of an enclosure or similar structure defining an external wall through which one or more optical fibers are routed. A rigid shoulder of the fiber optic receptacle is positioned within and abuts against the wall of the enclosure, thus providing superior retention for external pulling forces as compared to conventional assemblies that utilize a threaded nut on the inside of the wall for securing the receptacle. In the exemplary embodiments shown and described herein, the fiber optic plug portion is mounted to the end of a fiber optic cable comprising one or more optical fibers to be optically connected to a corresponding plurality of optical fibers received within the receptacle portion of the assembly. As used herein, the fiber optic cable of the plug is referred to as the "drop cable" and is intended to include all types of fiber optic cables such as, but not limited to a distribution cable, a branch cable, an extended distribution cable, a tether cable, a flat dielectric drop cable, a figure-eight drop cable and an armored drop cable. Furthermore, the particular components of the fiber optic receptacle and plug assemblies described herein may be modified as necessary to accommodate different types of fiber optic cables.

In the exemplary embodiments shown, the drop cable comprises a cable jacket, a strength component and an optical transmission component disposed within the cable jacket. In one embodiment, the strength component comprises two glass-reinforced plastic (GRP) strength components and the optical transmission component comprises an optical waveguide disposed within a central buffer tube. The drop cable may also comprise strength members that provide additional tensile strength. As used herein, the term "strength component" refers to a strength element having anti-buckling strength, while the term "strength member" refers to a strength element lacking anti-buckling strength. Furthermore, the term "tensile element" refers generically to either a strength component or a strength member. Strength members allow a fiber optic cable to have a smaller cross-sectional footprint due to the fact that they allow the strength components to have smaller diameters since they will not provide all of the tensile strength to the cable. In other words, both the strength components and the strength members carry the tensile load. Moreover, by using strength members, the cable remains relatively flexible and is easier to handle. It is understood that other cable types may be used in conjunction with the present invention. Moreover, various optical connectors may be used with different fiber optic cables according to the concepts of the present invention, thereby resulting in numerous fiber optic cable and connector combinations. The drop cable is preferably designed to provide stable performance over a wide range of temperatures and to be compatible with any telecommunications grade optical fiber. As used herein, the term "optical fiber" is intended to include all types of single mode and multimode light waveguides, including one or more bare optical fibers, coated optical fibers, loose-tube optical fibers, tight-buffered optical fibers, ribbonized optical fibers or any other expedient no known or hereinafter devised for transmitting light signals.

The fiber optic connector and plug assemblies of the present invention provide a sealed environment that prevents moisture and contamination from reaching the end faces of the opposing ferrules. In all embodiments, O-rings or flat elastomeric gaskets provide static seals. The position of the seals combined with relief features provided on the receptacle and plug minimize vacuum build-up while uncoupling the plug from the receptacle and pressure build-up while mating the plug with the receptacle. Generally speaking, most of the components of the receptacle and plug assembly are formed from a suitable polymer. Preferably, the polymer is a UV stabilized polymer such as ULTEM 2210 available from GE Plastics. However, other suitable high strength materials made also be used. For example, stainless steel or any other suitable metal may be used for various components to provide an even more robust receptacle and plug assembly.

Referring now to FIGS. 1–7, a fiber optic receptacle and plug assembly according to one embodiment of the present invention is shown. The assembly includes a fiber optic receptacle 20 and a corresponding fiber optic plug 22. Although not shown, the receptacle 20 is typically mounted within an opening, referred to herein as a "connector port," located in an external wall of an enclosure, such as a connection terminal in a fiber optic communications network. The receptacle 20 is operable for connecting optical fibers routed to the connector port from outside the connection terminal with optical fibers routed to the connector port from within the connection terminal. It should be understood, however, that the fiber optic receptacle 20 may be mounted to other enclosures and structures, including an internal wall of a re-enterable connection terminal. Each connector port is operable for receiving a receptacle 20 and at least one connectorized optical fiber on the inside of the connection terminal, and a plug 22 and at least one connectorized optical fiber of a drop cable 24 on the outside of the connection terminal. The plug 22 is mounted upon the end portion of the drop cable 24 and is adapted to mate with the corresponding receptacle 20. The plug 22 and the receptacle 20 are operable for aligning and maintaining the opposing optical fibers in physical contact. A single connector port may interconnect more than one optical fiber of the drop cable 24, either by accommodating a multifiber ferrule or by accommodating multiple single-fiber ferrules within the receptacle 20. A single connector port may also be adapted to accommodate more than one receptacle 20.

Referring specifically to FIG. 1, the receptacle 20 and the corresponding plug 22 are shown disengaged and with their respective protective dust cap 34 and pulling cap 28 removed. A threaded coupling nut 26 of the plug 22 of the assembly, operable for securing the plug 22 to the receptacle 20 upon engagement, may be used to secure the protective pulling cap 28 during installation. The pulling cap 28 defines a threaded portion 29 at its rearward end and a pulling loop 30 at its forward end. The pulling cap 28 provides protection of the optical connector 32 of the plug 22 during shipping, deployment and until engagement with the receptacle 20. The pulling cap 28 may be secured to the drop cable 24 using a tether 33 so that the pulling cap 28 may be reused if the plug 22 is disengaged from the receptacle 20 at a later time. In preferred embodiments, the pulling loop 30 should be able to withstand cable pulling forces up to about 600 lbs. The pulling loop 30 and the pulling cap 28 have a generally rounded forward end to facilitate deployment through conduits, ducts or over sheave wheels or pulleys. As with the plug 22 of the assembly, the receptacle 20 may also be covered and sealed with a threaded dust cap 34 that is removed prior to inserting the plug 22 within the receptacle 20. The dust cap 34 may also be secured to the receptacle 20 using a tether 33. At the end of the receptacle 20 opposite the threading, a protective boot 36 provides protection for the receptacle 20, and in some embodiments may also provide sealing. The protective seal boot 36 allows the assembly to be installed in a breathable enclosure and may become obsolete in the event the receptacle 20 is otherwise reliably sealed from the adverse environment.

Referring specifically to FIG. 2, the fiber optic plug 22 is mounted upon the end portion of the fiber optic drop cable 24 and is adapted to mate with the corresponding fiber optic receptacle 20. To secure the plug 22 and receptacle 20 together, the coupling nut 26 engages the threaded end of the receptacle 20. The manner in which the receptacle and plug assembly is secured within the connector port through the external wall of the connection terminal is described below.

Referring now to FIG. 3, the fiber optic receptacle 20 includes a receptacle housing 38 operable for mounting to the wall of the connection terminal. The housing 38 holds a ferrule assembly and aligns both the ferrule assembly and the fiber optic plug 22 so that they can engage in only one preferred orientation, as will be in more detail below and in FIG. 7. This feature is advantageous for installations including Angled Physical Contact (APC) type ferrules where minimal angular offset is required, as well as multi-fiber ferrules that often are not centric. The receptacle housing 38 defines an internal cavity 40 opening through opposed ends, a first end 42 and a second end 44. Typically, the opening through the first end 42 is relatively large so as to receive the corresponding fiber optic plug 22. Conversely, the opening through the second end 44 is typically smaller and, in one advantageous embodiment, is sized to be only slightly larger than the receptacle ferrule 46, such that the ferrule 46 can be inserted through the opening. The relatively large opening of the first end 42 allows cleaning with a cotton swab or special cleaning tool. This is advantageous since receptacles, in contrast to fiber optic plugs, may be exposed to weather while not being used for a prolonged period of time in which they may collect contamination. This embodiment allows for easy cleaning and improved access without requiring disassembly.

Although the fiber optic receptacle 20 may include a variety of fiber optic connectors including SC, LC, MTRJ, MTP, SC-DC, and the like, the receptacle 20 of the particular embodiment is shown to include a single SC connector by way of example, and not of limitation. Although not included in this particular embodiment, the fiber optic receptacle 20 may include an alignment sleeve disposed within the internal cavity 40 defined by the receptacle housing 38. In the embodiments shown throughout FIGS. 1–14, the alignment sleeve is a component of the plug 22 and is inserted into the internal cavity 40 of the receptacle 20 upon insertion of the plug 22. In this regard, the plug ferrule of the fiber optic plug 22 is inserted into one end of the alignment sleeve, while the receptacle ferrule 46 that is mounted upon the ends of optical fibers within the connection terminal is inserted through the opening defined by the second end 44 of the receptacle 20 and into the other end of the alignment sleeve.

As shown, the receptacle housing 38 is cylindrically shaped and defines a shoulder portion 48 positioned medially between the first end 42 and the second end 44. Upon installation through an external wall of a connection terminal, the first end 42 of the receptacle housing 38 is inserted through the wall from the inside of the connection terminal until the radial surface of the shoulder portion 48 facing the first end 42 abuts the inner surface of the wall. By securing the receptacle 20 within the opening through the external wall of the connection terminal using shoulder portion 48, as opposed to a threaded nut, the relatively low profile receptacle 20 provides strain relief against cable pulling forces of up to about 600 lbs. Preferably, a seal is provided between the shoulder portion 48 of receptacle housing 38 and the wall using an O-ring, an elastomeric ring, a multi-point seal 50 (as shown) or like sealing means. The receptacle housing 38 defines a notch 52 between the shoulder portion 48 and threaded portion for receiving the multi-point seal 50. The notch 52 may further receive a crescent ring 54 for retaining the multi-point seal 50 in place and securing the receptacle 20 within the connector port defined by the opening in the wall of the connection terminal. The coupling nut 26 of the plug 22 is used to further secure the receptacle 20 within the connector port when the plug 22 is mated with the receptacle 20.

The fiber optic receptacle 20 also includes a ferrule retainer 56 for retaining the receptacle ferrule 46 within the internal cavity 40 of the receptacle housing 38. The ferrule retainer 56 and the receptacle housing 38 can be connected in various manners, but, in one advantageous embodiment, the ferrule retainer 56 includes hooks 58 that are received by features 60 protruding outwardly from the receptacle housing 38. The ferrule retainer 56 can be removed from the receptacle housing 38 in order to access the receptacle ferrule 46, such as for cleaning, repair, replacement or the like. The design of the ferrule retainer 56 allows for easy removal without a special tool. Once the receptacle ferrule 46 has been cleaned, repaired or replaced as necessary, the ferrule retainer 56 can be connected once again to the receptacle housing 38.

The fiber optic receptacle 20 of the exemplary embodiment also includes a bias member disposed within the receptacle housing 38. The bias member operably engages the receptacle ferrule 46 and the ferrule retainer 56 to urge the receptacle ferrule 46 toward the first end 42 of the receptacle housing 38. Typically, the bias member consists of one or more springs 62. Thus, the receptacle ferrule 46 is spring-loaded and is allowed to float axially within the internal cavity 40, thus absorbing compressive forces between the receptacle ferrule 46 and the opposing plug ferrule. The boot 36 protects the components of the receptacle 20 positioned on the inside of the wall of the connection terminal. The protective boot 36 further defines an opening 64 for receiving optical fibers and/or a fiber optic cable (not shown) from the inside of the connection terminal.

Figure 4:
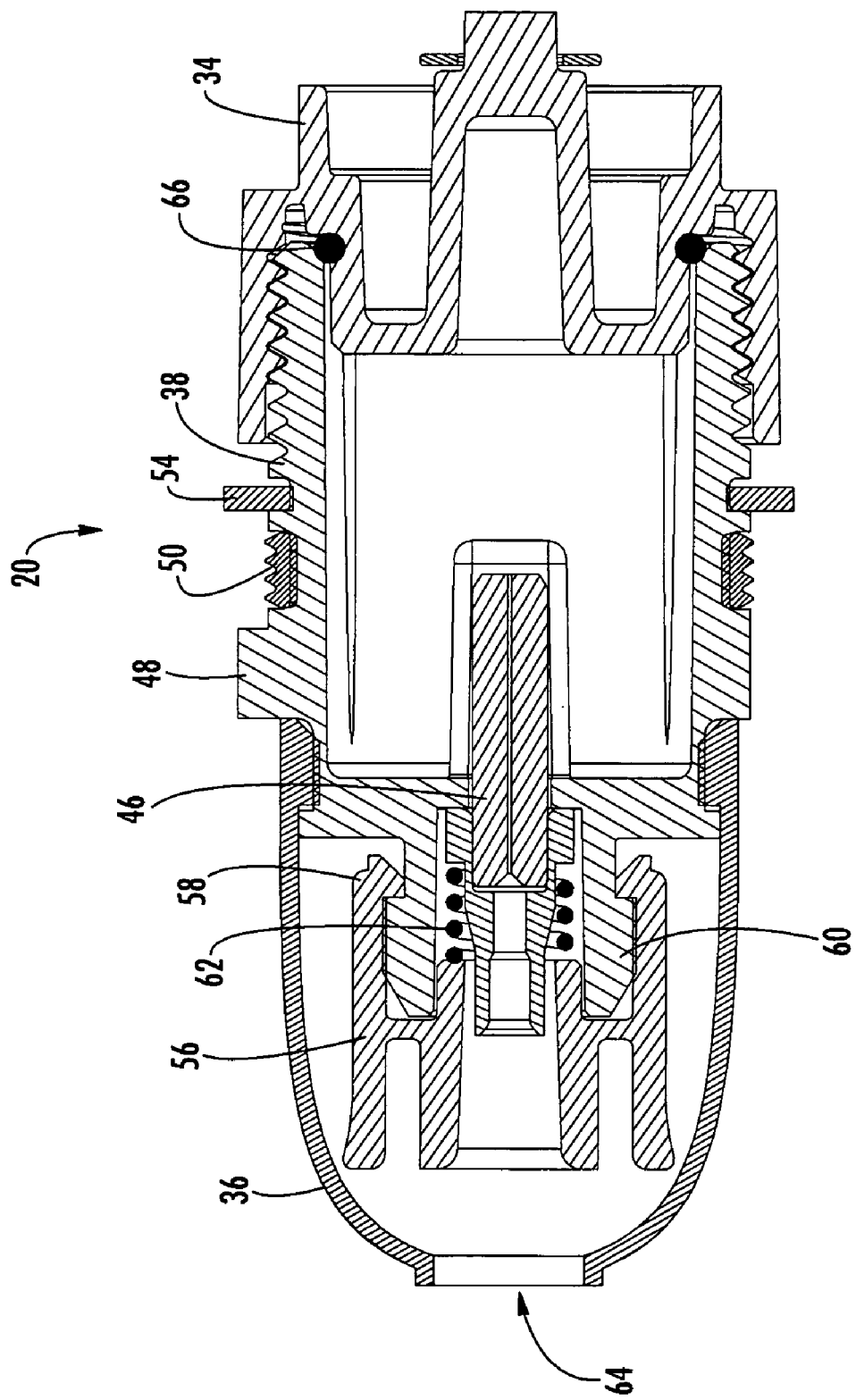
FIG. 4 is a cross-sectional view of the fiber optic receptacle of FIG. 3 shown in an assembled configuration.

FIG. 4 is a cross-section of the assembled receptacle assembly 20 of FIG. 3 taken along line A—A with like parts indicated by like reference numbers. An O-ring 66 may be used to provide a seal between the dust cap 34 and the receptacle housing 38. As is shown in FIG. 4, the multi-point seal 50 is retained within the groove 52 of the receptacle housing 38 and provides sealing points between the receptacle housing 38 and the wall of the connection terminal. The wall is positioned between the shoulder portion 48 of the receptacle housing 38 and the crescent ring 54. In one embodiment, the crescent ring 54 secures the receptacle 20 in place. In an alternative embodiment, the dust cap 34 or the coupling nut 26 of the fiber optic plug 22 is used to secure the receptacle 20 in place.

Figure 5:
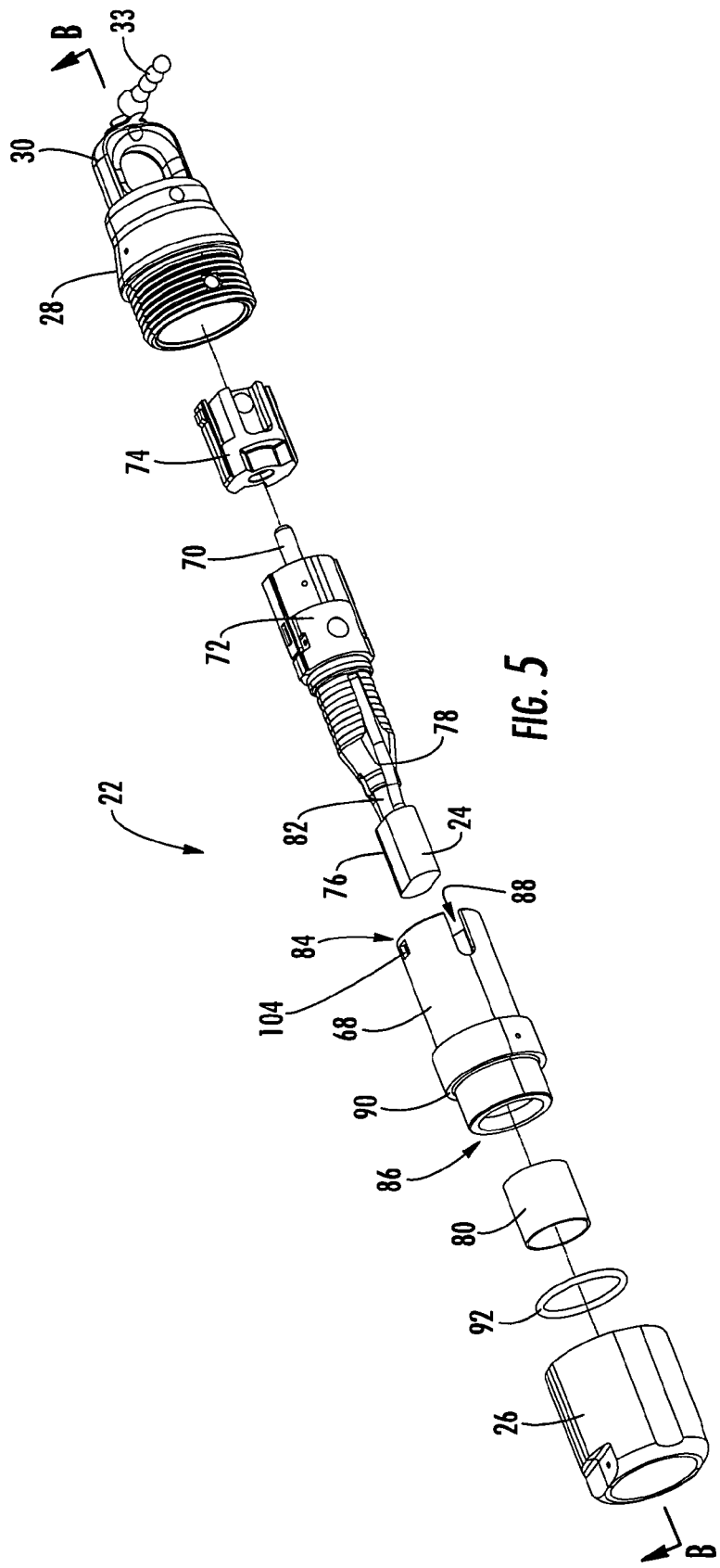
FIG. 5 is an exploded perspective view of the fiber optic plug of FIG. 1, including a plug body, a single-fiber ferrule, an alignment sleeve, a protective pulling cap, a crimp band and a coupling nut.

Referring to FIG. 5, the fiber optic plug 22 further includes a plug ferrule 70, an inner housing 72 with a crimp, an alignment sleeve 74, an outer housing 68 and a coupling nut 26. There may also be a molded-on plug boot (not shown) made of a flexible (silicone-type or other like) material secured over a portion of the outer housing 68 and a portion of the drop cable 24 in order to seal the exposed portion of the drop cable 24 while generally inhibiting kinking and providing bending strain relief to the cable 24 near the plug 22. The strength components 78 are terminated and a crimp band 80 is secured around the strength components 78. The crimp band 80 is preferably made from brass, but other suitable deformable materials may be used. The strength members (not shown) are cut flush with the stripped back jacket 76, thereby exposing the two GRP strength components 78 and optical component 82 adjacent the end of the drop cable 24. The crimp band 80 provides strain relief for the cable 24. The inner housing 72 is assembled by first crimping the crimp band 80 to the cable 24. The outer housing 68 is then slid over the inner housing 72. The outer housing 68 is threaded onto the cable 24 before the inner housing 72.

The plug ferrule 70 is at least partially disposed within the inner housing 72 and extends lengthwise. The plug ferrule 70 may therefore be mounted within the inner housing 72 such that the front face of the plug ferrule 70 extends somewhat beyond the forward end of the inner housing 72. As with the corresponding fiber optic receptacle 20, the fiber optic plug 22 may include a variety of fiber optic connectors including SC, LC, MTRJ, MTP, SC-DC, and the like. The plug 22 of the exemplary embodiment is shown to include a single SC connector because a receptacle 20 can only receive a plug of like ferrule configuration. The alignment sleeve 74 defines a lengthwise passageway for receiving the plug ferrule 70 and for receiving the receptacle ferrule 46 when the plug 22 is mated with the receptacle 20. As stated above, the alignment sleeve 74 may be a component of either the receptacle 20 or the plug 22, however, in the exemplary embodiment shown and described herein it is a component of the plug 22.

The outer housing 68 has a generally cylindrical shape with a forward first end 84 and a rearward second end 86. The outer housing 68 generally protects the inner housing 72 and in preferred embodiments also aligns and keys engagement of the plug 22 with the mating receptacle 20. Moreover, the inner housing 68 includes a through passageway between the first and second ends 84 and 86. The passageway of the inner housing 72 includes a keying feature so that the inner housing 72 is inhibited from rotating once the plug 22 is assembled. The first end 84 of the outer housing 68 includes a key slot 88 (FIG. 5 and FIG. 7) for aligning the plug 22 with the receptacle 20, and consequently, the inner housing 72 relative to the receptacle 20. The plug 22 and the corresponding receptacle 20 are shaped to permit mating in only one orientation. In preferred embodiments, this orientation may be marked on the receptacle 20 and on the plug 22 using alignment indicia so that a less skilled field technician can readily mate the plug 22 with the receptacle 20. Any suitable indicia may be used. After alignment, the field technician engages the internal threads of the coupling nut 26 with the external threads of the receptacle 20 to secure the plug 22 to the receptacle 20.

Figure 6:
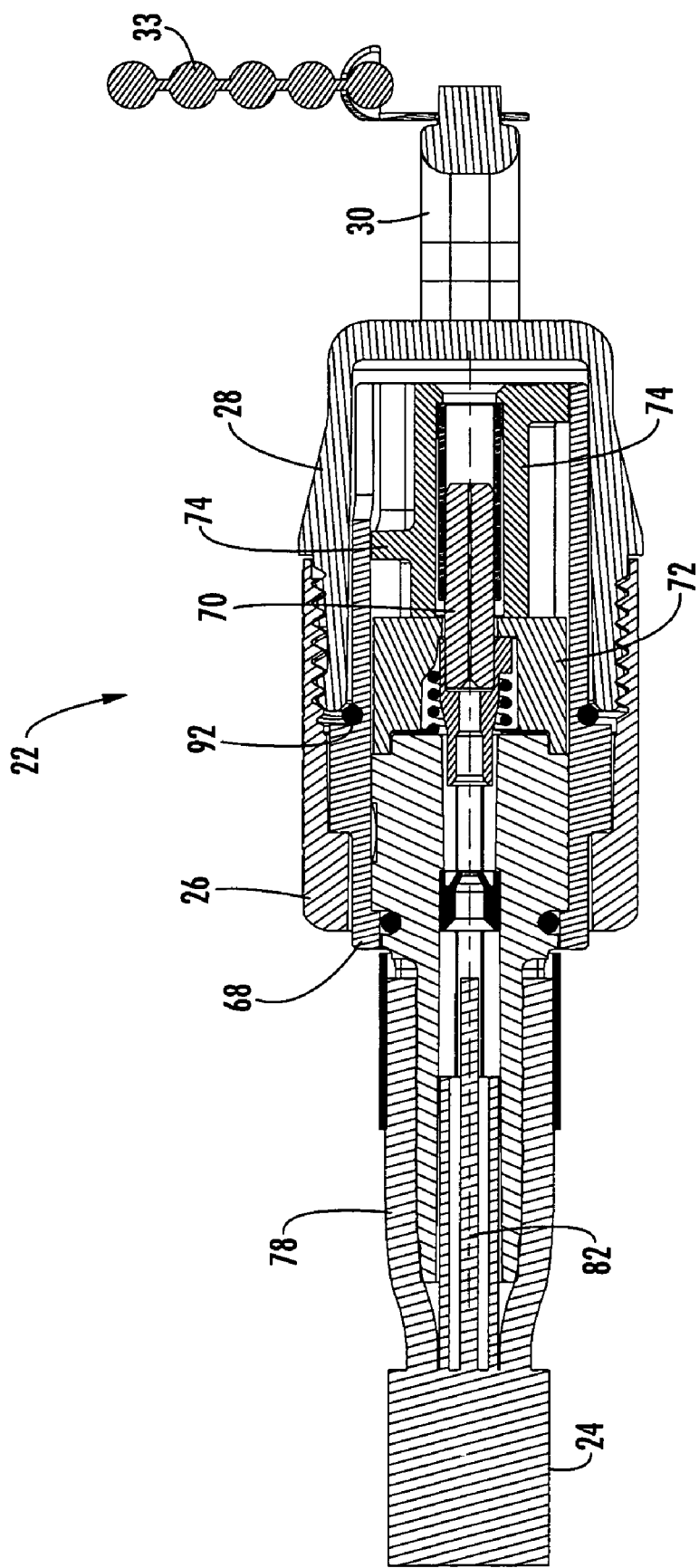
FIG. 6 is a cross-sectional view of the fiber optic plug of FIG. 5 shown in an assembled configuration.

The outer housing 68 of the plug 22 may further define a shoulder 90 that provides a mechanical stop for both a conventional elastomeric O-ring 92 and the coupling nut 26. The O-ring 92 provides a weatherproof seal when the coupling nut 26 engages the threaded portion of the receptacle 20. The coupling nut 26 has a passageway sized so that it fits over the second end 86 of the outer housing 68 and easily rotates about the outer housing 68. In other words, the coupling nut 26 cannot move in the direction of the receptacle 20 beyond the shoulder 90, but is able to rotate with respect to the outer housing 68. FIG. 6 is a cross-section of the assembled plug 22 of FIG. 5 taken along line B—B with like parts indicated by like reference numbers.

FIG. 7 is an end view of the receptacle 20 and plug 22 of FIG. 1 further illustrating the alignment and keying features of the assembly. As described above, the plug 22 engages the receptacle 20 to optically connect the optical fibers of the corresponding plug ferrule 70 and receptacle ferrule 46. The receptacle 20 and the alignment sleeve 74 define ferrule openings 100 corresponding to the number and type of mating ferrules. In the embodiment shown throughout FIGS. 1–7, one ferrule opening 100 is used to mate single-fiber SC ferrules, thus providing a "simplex" optical connector. The alignment sleeve 74 is retained and positioned within the outer housing 68 of the plug 22 such that the key slot 102 of the alignment sleeve 74 is aligned with the key slot 88 defined by the plug outer housing 68. In a preferred embodiment, the plug outer housing 68 defines a pair of openings 104 along its length adjacent first end 84 for receiving features 106 defined by the alignment sleeve 74. The features 106 are received by the openings 104 in order to properly align the alignment sleeve 74 within the plug outer housing 68, thus properly aligning the key slot 102 of the alignment sleeve 74 with the key slot 88 of the outer housing 68.

To perform an optical connection, the plug 22 is inserted into the receptacle 20. The receptacle 20 may only receive a plug 22 of like ferrule configuration. The receptacle 20 defines a key 108 that is received within the key slot 88 of the plug housing 68 and the key slot 102 of the alignment sleeve 74. As shown, the key 108 is a "T-shaped" structure molded into the receptacle 20. Receptacles having specific key shapes may be created for each type and/or number of ferrules. In an alternative embodiment, an insert having a specific key shape may be inserted into the receptacle housing 38 to accommodate a specific connector, thus allowing a generic receptacle housing to be used for different connector types. Upon connection, the key 108 accepts only a plug 22 of like ferrule configuration, while also properly aligning the plug 22 within the receptacle 20. Because the alignment and keying features extend to about the end of the plug 22, a plug 22 having a ferrule configuration different than the receptacle 20 may not be inserted into the receptacle 20, thereby eliminating potential damage to the ferrules. Alignment orientation is especially important in mating APC ferrules. The end face of an APC ferrule is disposed at a non-orthogonal angle, and generally at an angle of between about 6 and about 11 degrees relative to a plane normal to the longitudinal axis defined by the ferrule. Typically, the end face of an APC ferrule is disposed at about an 8-degree angle relative to the plane that extends normal to the longitudinal axis defined by the ferrule. In order to properly interconnect the optical fibers of a pair of opposing APC ferrules, the ferrules must be positioned such that the angled end faces are complimentary to one another, that is, the forwardmost portion of the end face of one ferrule is opposite the rearward most portion of the end face of the other ferrule. In order to facilitate the alignment of the ferrules in this complimentary fashion, the key 108 is disposed in a predetermined orientation relative to the end face of the ferrule.

Referring to FIG. 8, a dual-fiber version of a fiber optic receptacle and plug assembly is shown disengaged and with the protective respective dust cap and pulling cap of the receptacle 20 and plug 22 removed. In this embodiment, the drop cable comprising two optical waveguides is not shown for purposes of clarity. As with the embodiment shown in FIGS. 1–7, the receptacle 20 is mounted within a connector port defined by an opening through an external wall of a connection terminal. The plug 22 is aligned with and engages only a receptacle 20 of like optical connector and ferrule configuration. The plug 22 shown allows a single receptacle 20 of a connection terminal to accommodate more than one optical fiber of the drop cable for optical connection with more than one optical fiber terminated from a distribution cable within the connection terminal. At the same time, the drop cable associated with the plug 22 is strain relieved at the connector port to withstand a drop cable pulling force of up to about 600 lbs.

The receptacle 20 and the corresponding plug 22 are shown disengaged and with their respective dust cap 34 and pulling cap 28 removed. A threaded coupling nut 26 of the plug 22 of the assembly is operable for securing the protective puling cap 28 during shipping and deployment, and is operable for securing the plug 22 to the receptacle 20 upon engagement when mating the plug 22 to the receptacle 20. A protective boot 36 allows the assembly to be installed in a breathable enclosure and may become obsolete in the event that the receptacle 20 is otherwise reliably sealed from the environment within the connection terminal. As in the previous embodiment, the plug outer housing 68 has a generally cylindrical shape and includes alignment and keying features for mating the plug 22 with the receptacle 20. In particular, the outer housing 68 defines an alignment and keying feature on plug 22. As shown herein and previously described, the alignment and keying feature is in the form of a lengthwise key slot 94. The key slot 94 has a specific shape so that the plug 22 and receptacle 20 mate in only one orientation. In preferred embodiments, the orientation may be marked on both the outer housing 68 and the receptacle housing 38 so that a less skilled field technician can readily mate the plug 22 with the receptacle 20 by aligning an alignment indicia on the outer housing 68 with a complimentary alignment indicia disposed on the receptacle housing 38. Thereafter, the field technician engages the internal threads of the coupling nut 26 with the external threads on the receptacle housing 38 to secure the plug assembly 22 to the receptacle 20.

Referring to FIG. 9, the fiber optic plug 22 may be mounted upon any suitable fiber optic drop cable including more than one optical fiber since the optical connector shown includes more than one ferrule, such as a pair of LC ferrules. To secure the plug 22 to the receptacle 20, the coupling nut 26 engages the threaded end of the receptacle 20. The plug 22 may be secured in the field without special tools, equipment or training. Additionally, the physical connection may be easily connected or disconnected, thereby mating or un-mating the plug 22 with the receptacle 20, by engaging or disengaging the threads of the coupling nut 26 with the threads of the receptacle 20. Thus, the receptacle and plug assembly of the present invention allows the deployment of multiple optical fibers through a connector port provided in an external wall of a conventional network connection terminal in an easy and economical manner.

Figure 10:
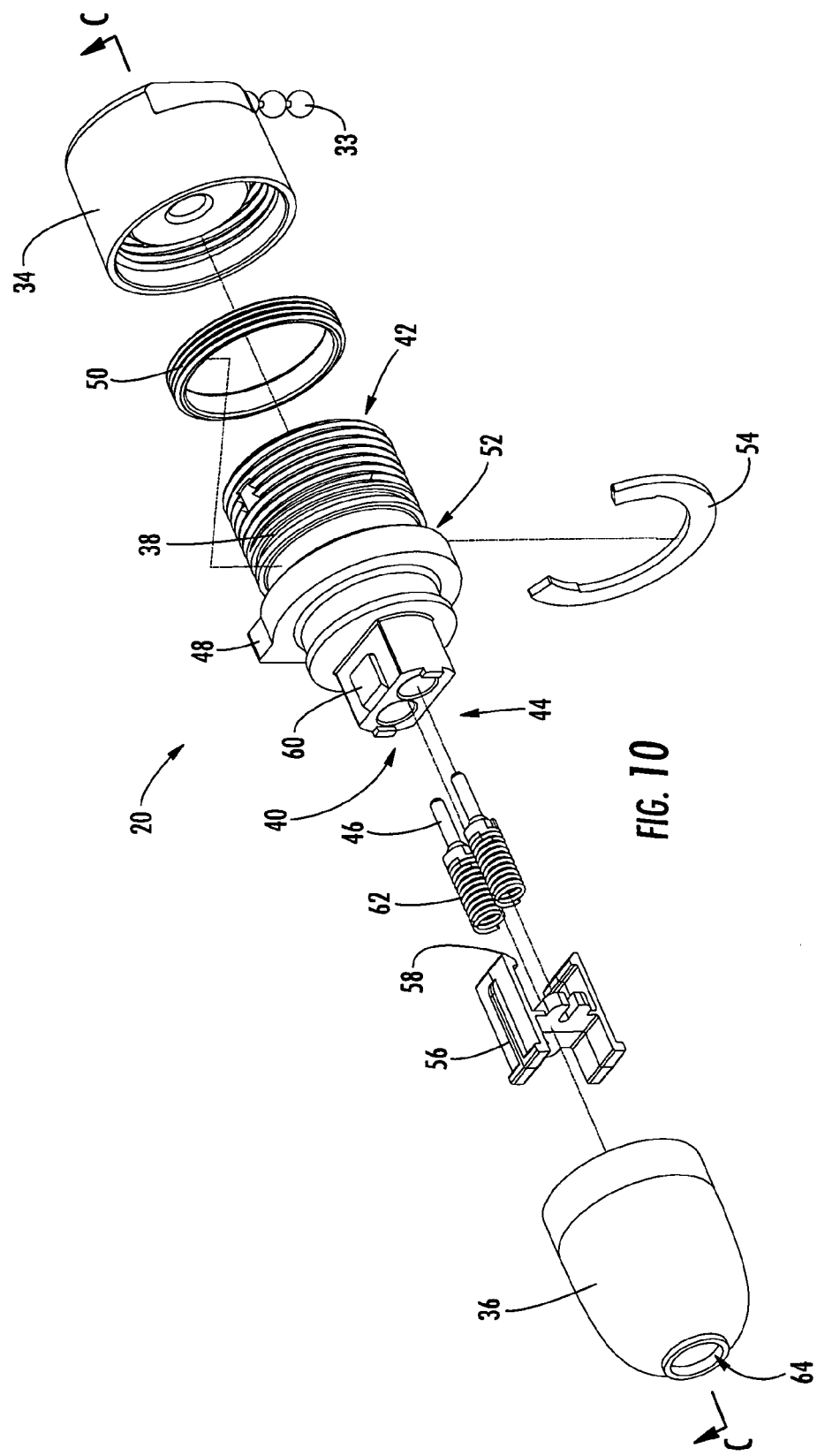
FIG. 10 is an exploded perspective view of the fiber optic receptacle of FIG. 8, including a receptacle body, a pair of single-fiber ferrules, a ferrule retainer, a protective end cap and a seal boot.

Referring to FIG. 10, as in the embodiment described above, the fiber optic receptacle 20 includes a receptacle housing 38 operable for mounting to the wall, while holding a ferrule and aligning the ferrule with the fiber optic plug 22 so that they can engage in only a preferred orientation. The receptacle housing 38 defines an internal cavity 40 opening through opposed ends, a first end 42 and a second end 44. The openings through the second end 44 are typically smaller and, in one advantageous embodiment, are sized to be only slightly larger than the receptacle ferrules 46, such that the receptacle ferrules 46 can be inserted through the opening. Although the fiber optic receptacle 20 may include a variety of fiber optic connectors including SC, LC, MTRJ, MTP, SC-DC, and the like, the receptacle 20 of the particular embodiment is shown to include a pair of LC connectors by way of example, and not of limitation. As in the previous embodiment, the alignment sleeve 74 is a component of the plug 22 and is inserted into the internal cavity 40 of the receptacle 20 upon insertion of the plug 22 through first end 42 of receptacle 20.

The receptacle housing 38 in the embodiment shown is cylindrically shaped and defines a shoulder portion 48 positioned medially between the first end 42 and the second end 44. Upon installation of the receptacle 20 within a connector port through an external wall of a connection terminal, the first end 42 of the receptacle housing 38 is inserted through the wall from the inside of the connection terminal until the surface of the shoulder portion 48 facing the first end 42 comes into contact with the inner surface of the wall. A seal may be provided between the receptacle housing 38 and the wall using an O-ring (not shown), multi-point seal 50 or like sealing means. The receptacle 20 also includes a ferrule retainer 56 operable for retaining the receptacle ferrules 46 within the internal cavity 40 of the receptacle housing 38. The ferrule retainer 56 defines clips or hooks 58 that grip features 60 defined by the receptacle housing 38. The ferrule retainer 56 can be removed from the receptacle housing 38 to access the receptacle ferrules 46, such as for cleaning, repair, replacement or the like.

Figure 11:
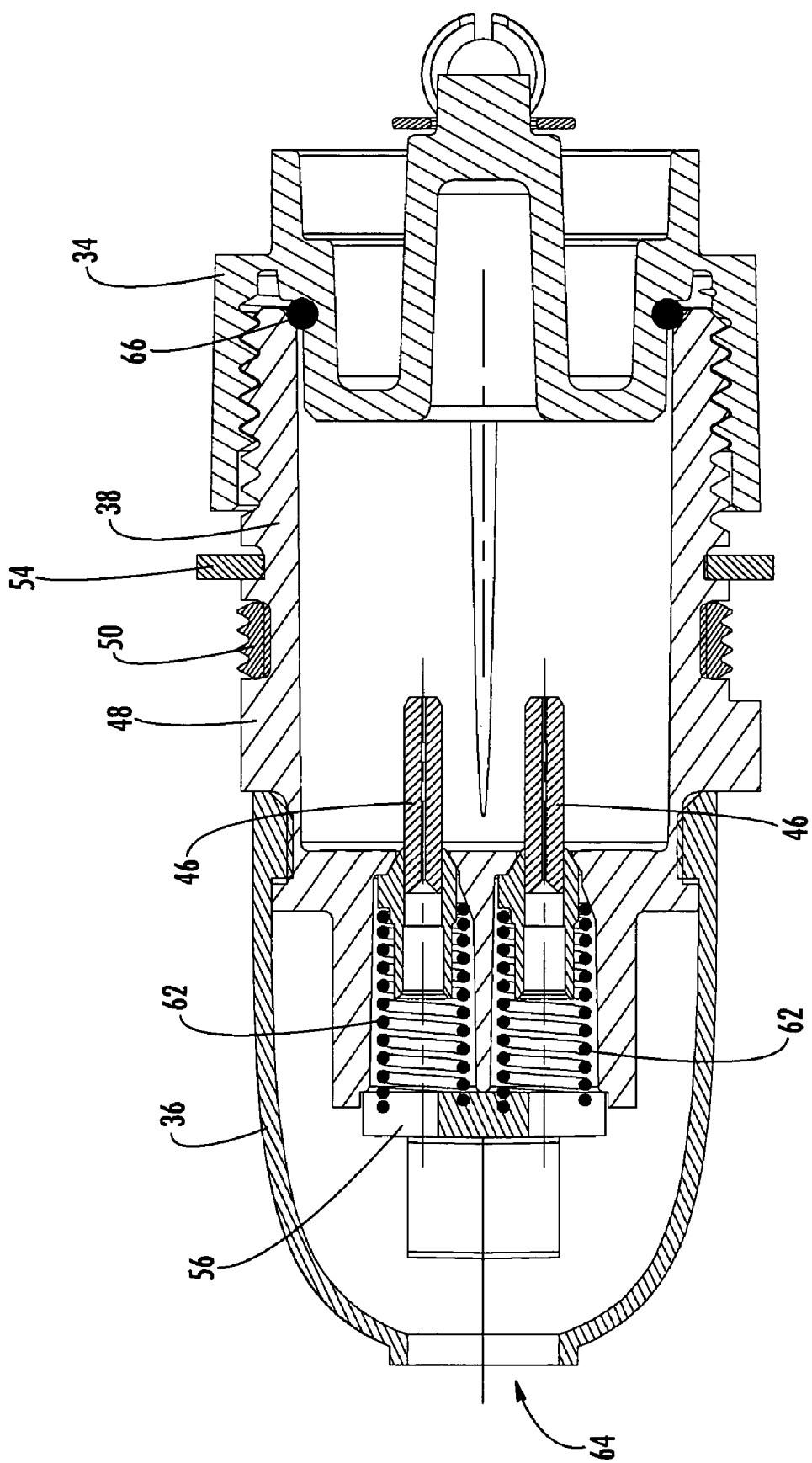
FIG. 11 is a cross-sectional view of the fiber optic receptacle of FIG. 10 shown in an assembled configuration.

The fiber optic receptacle 20 of this exemplary embodiment also includes bias members disposed within the receptacle housing 38. The bias members operably engage the receptacle ferrules 46 and the ferrule retainer 56 to urge the receptacle ferrules 46 toward the first end 42 of the receptacle housing 38. Typically, the bias members consist of one or more springs 62. Thus, the receptacle ferrules 46 are spring-loaded and thereby allowed to float axially within the internal cavity 40, thus absorbing compressive forces between the receptacle ferrules 46 and the opposing plug ferrules. It should be understood, however, that the fiber optic receptacle 20 can include other types of bias members, in addition to or instead of one or more springs 62. The ferrule holder 56 may also include one or more posts (not shown) extending in a lengthwise direction such that a spring can be mounted upon each respective post. In such case, each spring 62 would be longer than its respective post, even in the compressed state. As such, the posts serve to position the springs 62 that, in turn, contact the receptacle ferrules 46. FIG. 11 is a cross-section of the assembled plug 22 of FIG. 10 taken along line C—C with like parts indicated by like reference numbers. An elastomeric O-ring seal 66 may be disposed between the dust cap 34 and the receptacle housing 38. The fiber optic receptacle 20 is adapted to receive a corresponding fiber optic plug 22 such that plug ferrules 70 of the fiber optic plug 22 are aligned with and inserted into the first end 42 of the receptacle housing 38.

Figure 12:
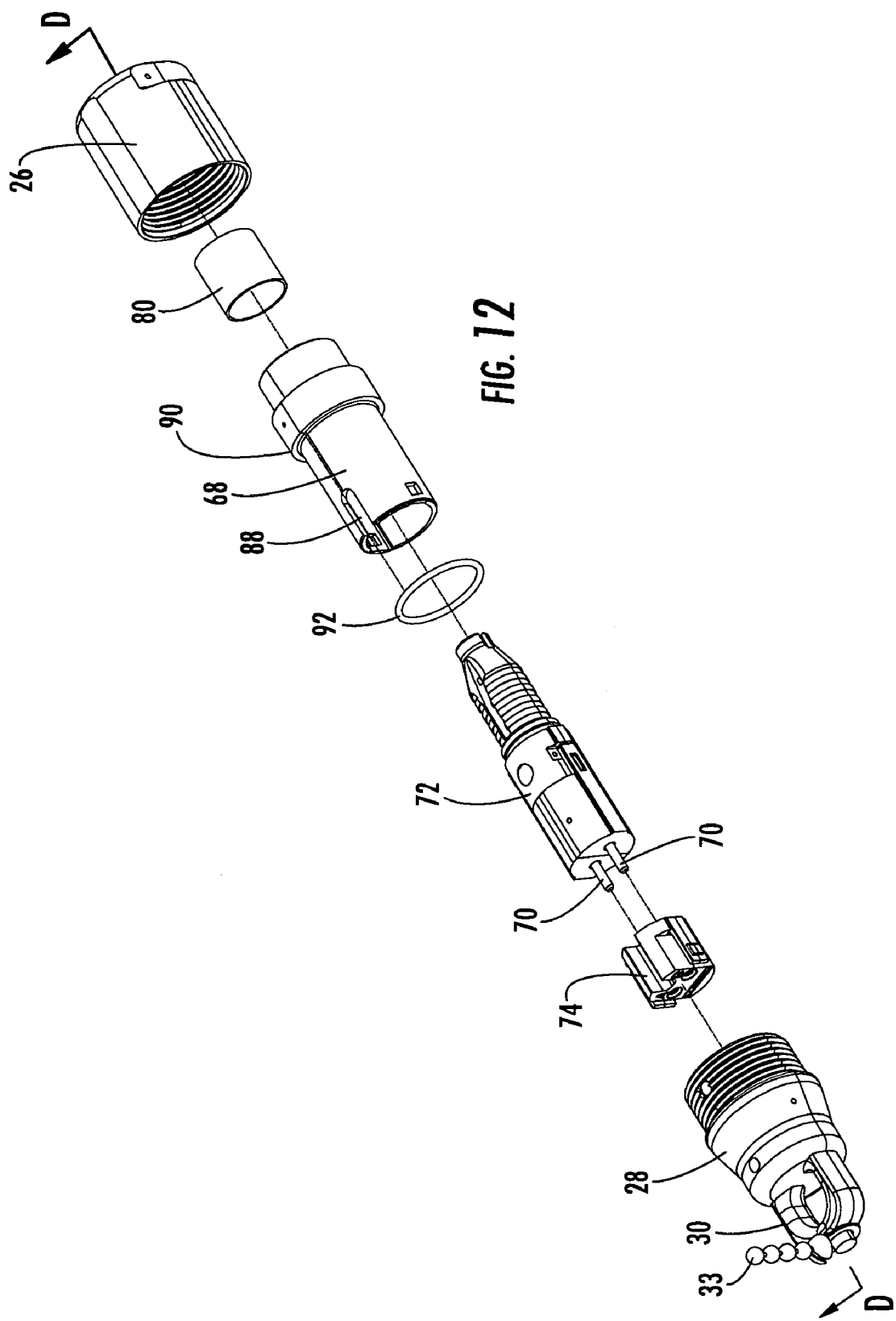
FIG. 12 is an exploded perspective view of the fiber optic plug of FIG. 8, including a plug body, a pair of single-fiber ferrules, an alignment sleeve, a protective pulling cap, a crimp band and a coupling nut.

Referring to FIG. 12, the corresponding plug 22 for the receptacle 20 shown in FIGS. 10 and 11 generally includes a plug inner housing 72, plug ferrules 70, an alignment sleeve 74, outer housing 68 and coupling nut 26. There may also be a molded-on plug boot (not shown) made of a flexible (silicone-type or other like) material secured over a portion of the outer housing 68 and a portion of the drop cable (not shown) to seal and provide bending strain relief to the cable near the plug 22. The crimp band 80 is secured around the strength components (not shown) of the cable and provides strain relief for the cable. The plug ferrules 70 are partially disposed within the inner housing 72 and extend lengthwise. To match the corresponding receptacle 20, the fiber optic plug 22 may include a variety of fiber optic connectors including SC, LC, MTRJ, MTP, SC-DC, and the like. The plug 22 of this exemplary embodiment is shown to include a pair of LC connectors which are smaller than SC connectors, thus allowing the diameter of the assembly to remain the same as the exemplary embodiment previously described. The plug ferrules 70 are received within a lengthwise passageway defined by the alignment sleeve 74 for mating the plug ferrules 70 and the receptacle ferrules 46. The receptacle ferrules 46 are inserted into the open forward end of the alignment sleeve 74. Thus, the alignment sleeve 74 serves to align the plug ferrules 70 positioned within the alignment sleeve 74 with the receptacle ferrules 46 received within the other end of the alignment sleeve 74 when the plug 22 is inserted into the receptacle 20. As such, the optical fibers upon which the respective ferrules are mounted are correspondingly aligned and optically interconnected.

The outer housing 68 generally protects the inner housing 72 and in preferred embodiments also aligns and keys mating of the plug 22 with the receptacle 20. Moreover, the inner housing 72 includes a through passageway that is keyed so that the inner housing 72 is inhibited from rotating when the plug 22 is assembled. The outer housing 68 includes a key slot 88 defined by the outer housing 68 for aligning the plug 22 with the receptacle 20. The plug 22 and the corresponding receptacle 20 are shaped to permit mating in only one orientation. After alignment, the field technician engages the internal threads of the coupling nut 26 with the external threads of the receptacle 20 to secure the plug 22 to the receptacle 20.

Figure 13:
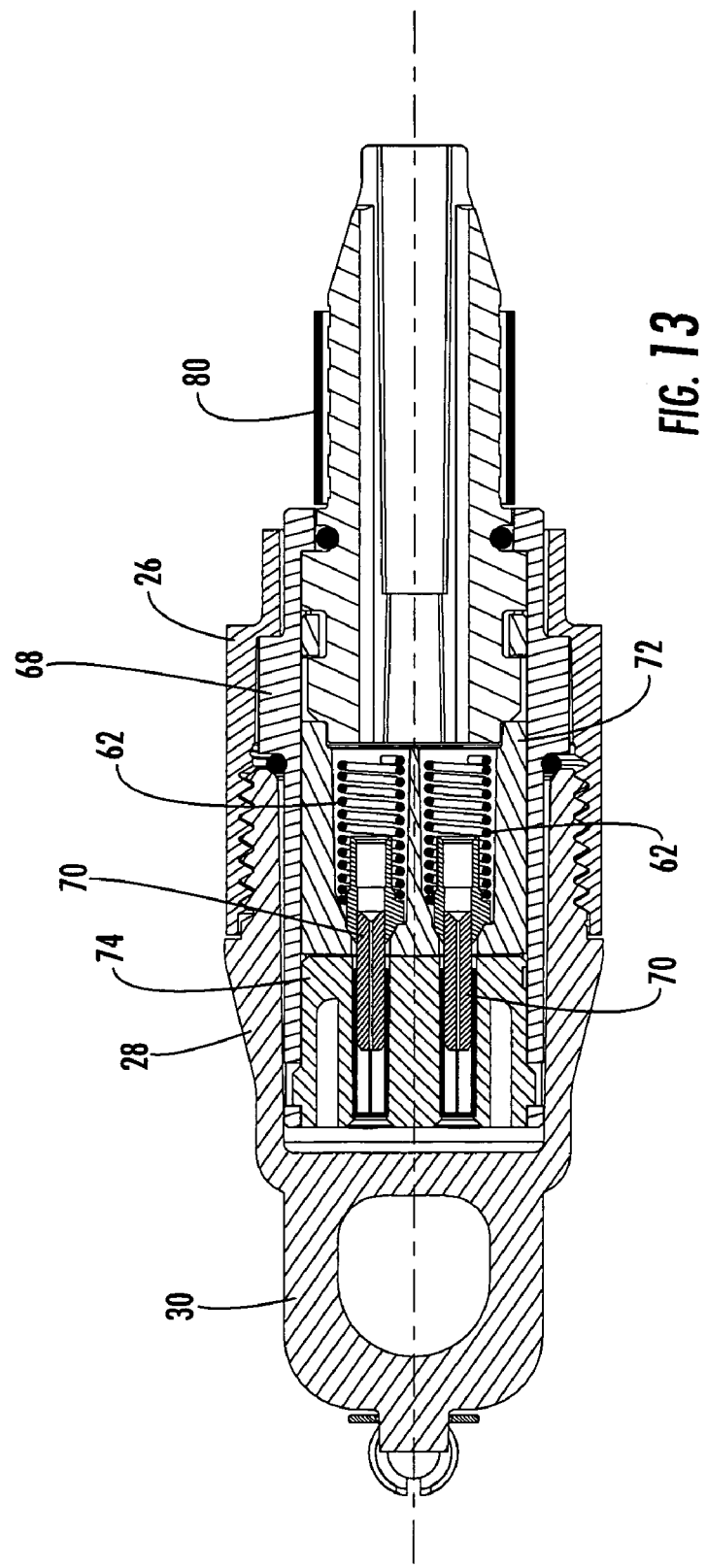
FIG. 13 is a cross-sectional view of the fiber optic plug of FIG. 12 in an assembled configuration.

The outer housing 68 may further define a shoulder 90 that provides a mechanical stop for both an O-ring 92 and the coupling nut 26. The O-ring 92 provides a weatherproof seal between the plug 22 and the receptacle 20. The coupling nut 26 has a passageway sized so that it fits over the end of the outer housing 68 and easily rotates about the outer housing 68. FIG. 13 is a cross-section of the assembled plug 22 of FIG. 12 taken along line D—D with like parts indicated by like reference numbers.

Figure 14:
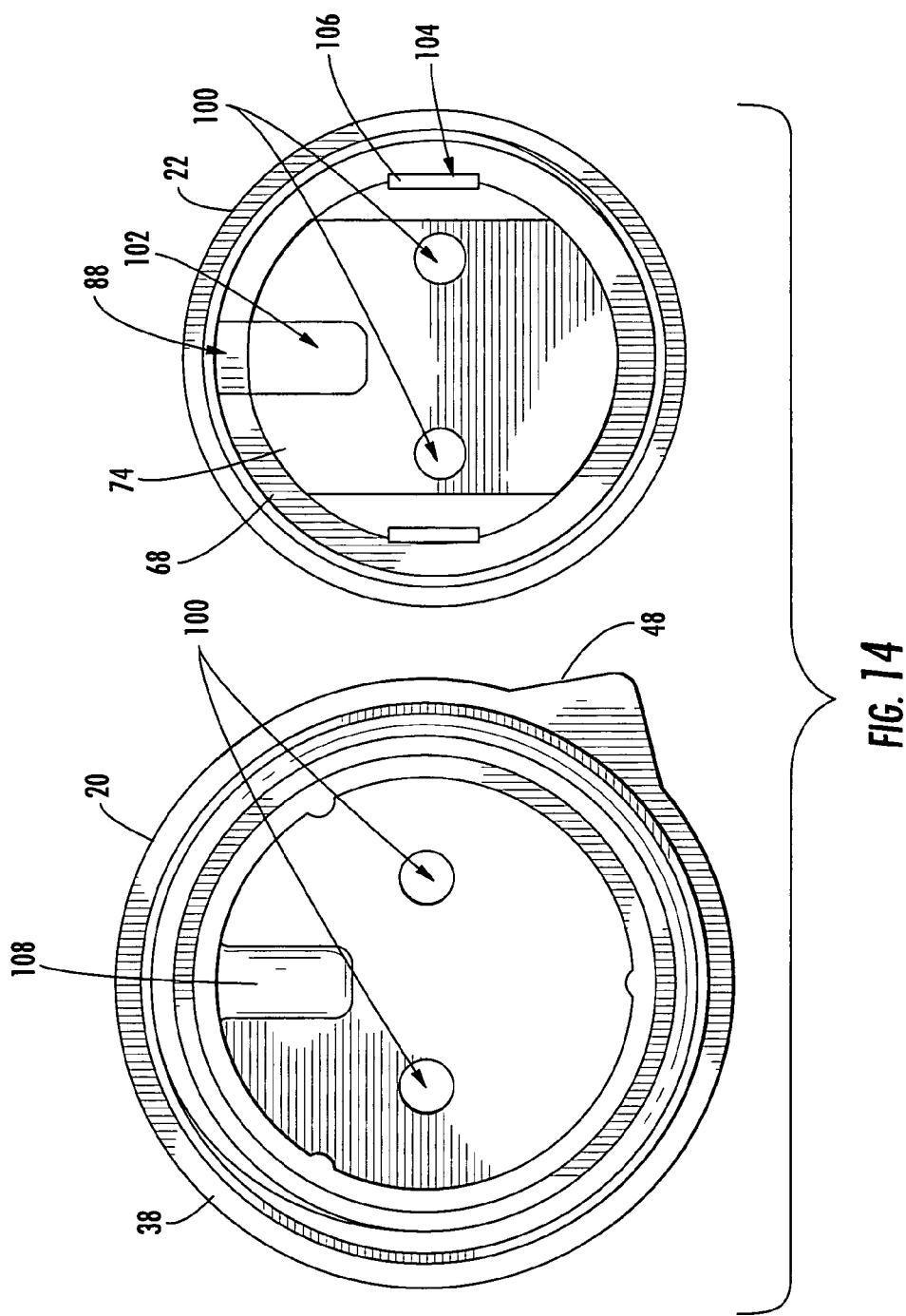
FIG. 14 is an end view of the receptacle and plug of FIG. 8 shown disengaged to illustrate the alignment and keying features of the receptacle and plug assembly.

FIG. 14 is an end view of the receptacle 20 and plug 22 of FIG. 8 further illustrating the alignment and keying features of the assembly. The receptacle 20 and the alignment sleeve 74 define ferrule openings 100 corresponding to the number and type of receptacle ferrules 46 and plug ferrules 70, respectively. In the embodiment shown throughout FIGS. 8–13, pairs of ferrule openings 100 are used to mate the opposing pairs of LC receptacle ferrules 46 and LC plug ferrules 70, respectively, thus providing a "duplex" optical connector. The alignment sleeve 74 is retained and positioned within the outer housing 68 of the plug 22 such that the key slot 102 of the alignment sleeve 74 is aligned with the key slot 88 defined by the plug outer housing 68. In a preferred embodiment, the plug outer housing 68 defines a pair of openings 104 along its length for receiving features 106 defined by the alignment sleeve 74. The features 106 are received by the openings 104 in order to properly align the alignment sleeve 74 within the plug outer housing 68, thus properly aligning the key slot 102 of the alignment sleeve 74 with the key slot 88 of the outer housing 68. While the key slot 102 of the alignment sleeve 74 is preferably specific for each connector type, the key slot 88 of the outer housing 68 may be generic for all connector types, thus permitting the use of a common plug outer housing 68 for all connector types.

To perform an optical connection, the plug 22 is inserted into the receptacle 20. The receptacle 20 is configured to receive only a plug 22 of like ferrule configuration. The receptacle 20 defines a key 108 that is received within the key slot 88 of the plug housing 68 and the key slot 102 of the alignment sleeve 74. As shown, the key 108 is an "I-shaped" structure molded into the receptacle 20. Receptacles having specific keying shapes may be created for each type and/or number of ferrules. In an alternative embodiment, an insert having a specific key shape may be inserted into the receptacle housing 38 to accommodate a specific connector, thus allowing a generic receptacle housing to be used for different connector types. Upon connection, the key 108 accepts only a plug 22 of like ferrule configuration, while also properly aligning the plug 22 within the receptacle 20. Because the alignment and keying features extend to about the end of the plug 22, a plug 22 having a ferrule configuration different than the receptacle 20 may not be inserted into the receptacle 20, thereby eliminating potential damage to the receptacle ferrules 46 and the plug ferrules 70.

In alternative embodiments, the threads of the coupling nut 26 and the receptacle housing 38 may be replaced with a bayonet or push-pull mechanism to secure the plug 22 within the receptacle 20. Alternatively, a spring clip or similar device may be added to engage the plug 22 and the receptacle 20 to secure them together. Sealing may be removed or relaxed based upon the extent of the adverse environment to which the assembly is exposed. The plug boot may be pre-manufactured and assembled onto the plug inner housing 72 and the drop cable 24, or may be overmolded using a technology available from Corning Cable Systems LLC of Hickory, N.C. Further, heat shrinkable tubing may be used to fulfill the same purpose as the boot when aesthetics are less important and bend characteristics less stringent. As previously stated, the alignment sleeve 74 may be integrated into the receptacle 20 while maintaining the same assembly technique and allowing for easy removal and cleaning.

Designs for several types of ferrules (including multi-fiber) can be derived from the base design shown and described herein. Multi-fiber ferrule designs driven by the available space and requirements are possible, such as MTP, MTRJ, DC, multiple 1.25 mm, multiple 2.5 mm, etc. Additional strain relief may be added to the receptacle 20 if needed. Crimping solutions may differ depending on the drop cable type and requirements. If the drop cable does not include the dual GRP dielectric strength members as shown in the first embodiment, the methods of coupling the strength member to the plug body may include glue or other means of fastening, such as clamps.

The embodiments described above provide advantages over conventional fiber optic receptacle and plug assemblies. For example, the small size of the exemplary embodiments described herein allows for about a 38 mm diameter package for FTTx distribution cables and allows the receptacles to be mounted in connection terminals or other enclosures requiring very little penetration depth of the receptacle into the terminal or enclosure. The alignment and keying features of these assemblies makes them fully APC capable, and the unique fit prevents assembly errors during production and installation. By locating the alignment sleeve 74 within the plug 22 as opposed to the receptacle 20, the receptacle volume is reduced and components of the receptacle 20 exposed to the adverse environment for prolonged periods of time may be readily accessed and cleaned. An overmolded boot eliminates the need for heat shrinkable tubing and also improves the sealing integrity of the assembly under adverse conditions in which a pre-formed boot may disengage from the plug 22.

The foregoing is a description of various embodiments of the invention that are given here by way of example only. Although fiber optic receptacle and plug assemblies have been described with reference to preferred embodiments and examples thereof, other embodiments and examples may perform similar functions or achieve similar results. All such equivalent embodiments and examples are within the spirit and scope of the present invention and are intended to be covered by the appended claims.

That which is claimed is:

1. A fiber optic receptacle and plug assembly, comprising:
   a fiber optic receptacle adapted to be mounted within an opening formed through a wall of a connection terminal, the receptacle comprising:
     a receptacle housing defining an internal cavity opening through opposed first and second ends, the housing comprising an alignment and keying feature and a shoulder operable for securing the receptacle against an inner surface of the wall of the connection terminal; and
     a ferrule retainer for retaining at least one receptacle ferrule within the internal cavity of the housing; and
   a fiber optic plug adapted to be mated with the receptacle, the plug comprising;

a plug inner housing;

a plug outer housing disposed about the inner housing and defining a first complimentary alignment and keying feature for engaging the alignment and keying feature of the receptacle when the plug is mated with the receptacle; and an alignment sleeve operable for retaining at least one plug ferrule within the plug outer housing, the alignment sleeve defining a second complimentary alignment and keying feature for engaging the alignment and keying feature of the receptacle when the plug is mated with the receptacle.

2. The fiber optic receptacle and plug assembly of claim 1, wherein the receptacle further comprises at least one bias member that operably engages the ferrule retainer to urge the at least one receptacle ferrule toward the first end of the receptacle housing.

3. The fiber optic receptacle and plug assembly of claim 1, wherein the alignment and keying feature of the receptacle is one of a key and a key slot and wherein the first and second complimentary alignment and keying features of the outer housing and the alignment sleeve are the other of the key and the key slot.

4. The fiber optic receptacle and plug assembly of claim 1, wherein the receptacle housing comprises a threaded portion at least partially between the first end and the shoulder and wherein the plug comprises a threaded coupling nut for engaging the threaded portion of the receptacle to secure the shoulder against the inner surface of the wall of the connection terminal.

5. The fiber optic receptacle and plug assembly of claim 1, wherein the alignment and keying feature of the receptacle ensures alignment of the at least one receptacle ferrule opposite the at least one plug female within the passageway defined by the alignment sleeve.

6. The fiber optic receptacle and plug assembly of claim 5, wherein the receptacle ferrule and the plug ferrule are each selected from the group consisting of SC, LC, MTRJ, MTP and SC-DC ferrules and wherein the receptacle ferrule and the plug ferrule have a like configuration.

7. The fiber optic receptacle and plug assembly of claim 6, wherein the receptacle fertile and the plug ferrule are each Angled Physical Contact (APC) ferrules and wherein the alignment and keying feature of the receptacle ensures mating of the plug and the receptacle with proper alignment of the opposing APC receptacle ferrule and APC plug ferrule.

8. An optical connector comprising:

a fiber optic receptacle defining an internal cavity and an alignment and keying feature disposed within the internal cavity, the receptacle comprising at least one receptacle ferrule retained within the internal cavity;

a fiber optic plug comprising a plug housing defining a first complimentary alignment and keying feature for engaging the alignment and keying feature of the receptacle when the plug is mated wit the receptacle; and an alignment sleeve disposed within the plug housing and defining at least one passageway for receiving at least one plug ferrule;

wherein the alignment sleeve defines a second complimentary alignment and keying feature for engaging the alignment and keying feature of the receptacle when the plus is mated with the receptacle.

9. The optical connector of claim 8, wherein the receptacle further comprises at least one bias member for operably engaging a ferrule retainer to urge the at least one receptacle ferrule toward the at least one plug ferrule when the plug is mated with the receptacle.

10. The optical connector of claim 8, wherein to alignment and keying feature of to receptacle is one of a key and a key slot and wherein the first and second complimentary alignment and keying features of the plug housing and to alignment sleeve are the other of the key and the key slot.

11. The optical connector of claim 8, wherein to alignment and keying feature of the receptacle ensures alignment of the least one receptacle ferrule opposite the least one plug ferrule within the passageway defined by the alignment sleeve.

* * * * *